US011855872B2

(12) United States Patent
Liu et al.

(10) Patent No.: US 11,855,872 B2
(45) Date of Patent: Dec. 26, 2023

(54) METHODS, SYSTEMS, AND COMPUTER READABLE MEDIA FOR NETWORK TRAFFIC GENERATION USING MACHINE LEARNING

(71) Applicant: Keysight Technologies, Inc., Santa Rosa, CA (US)

(72) Inventors: Winston Wencheng Liu, Woodland Hills, CA (US); Dan Mihailescu, Mogosoaia (RO); Razvan Ionut Stan, Agoura Hills, CA (US); Thomas Ameling, Woodland Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 342 days.

(21) Appl. No.: 17/368,439

(22) Filed: Jul. 6, 2021

(65) Prior Publication Data

US 2023/0006912 A1 Jan. 5, 2023
US 2023/0171177 A9 Jun. 1, 2023

(30) Foreign Application Priority Data

Jul. 2, 2021 (RO) ................. a 2021 00386

(51) Int. Cl.
*H04L 43/50* (2022.01)
*G06N 3/042* (2023.01)
(52) U.S. Cl.
CPC ............ *H04L 43/50* (2013.01); *G06N 3/042* (2023.01)

(58) Field of Classification Search
CPC ....... H04L 43/50; H04L 43/12; H04L 43/062; G06N 3/042; G06N 3/0475; G06N 3/094
See application file for complete search history.

(56) References Cited

U.S. PATENT DOCUMENTS

| 9,628,339 B1* | 4/2017 | Thai ..................... H04L 67/01 |
| 10,686,671 B1* | 6/2020 | Mozumdar ............ H04L 41/12 |
| 2003/0093254 A1* | 5/2003 | Frankel ................. H04L 43/50 |
| | | 703/13 |
| 2007/0025261 A1* | 2/2007 | Ginsberg .............. H04L 43/50 |
| | | 370/250 |

(Continued)

OTHER PUBLICATIONS

"Security Testbed for Internet-of-Things Devices"; Siboni et al.; IEEE Transactions on Reliability, vol. 68, No. 1, Mar. 2019 (Year: 2019).*

(Continued)

*Primary Examiner* — Benjamin H Elliott, IV

(57) ABSTRACT

Methods, systems, and computer readable media for network traffic generation using machine learning. An example method includes collecting first traffic from a production data center environment. At least a portion of the first traffic comprises live computer network traffic transiting the production data center environment. The method includes collecting second traffic from an emulated data center testbed device. At least a portion of the second traffic comprises testbed traffic that transits an emulated data center switching fabric of the emulated data center testbed device. The method includes training a traffic generation inference engine using the first traffic and the second traffic. The method includes generating, using the traffic generation inference engine, test traffic to test or stimulate a network system under test (SUT).

20 Claims, 9 Drawing Sheets

(56) References Cited

U.S. PATENT DOCUMENTS

| | | | | |
|---|---|---|---|---|
| 2007/0211640 A1* | 9/2007 | Palacharla | ............ | H04L 49/555 370/389 |
| 2008/0010523 A1* | 1/2008 | Mukherjee | ............. | H04L 43/50 714/25 |
| 2009/0310491 A1* | 12/2009 | Ginsberg | ............. | H04L 43/026 370/241 |
| 2011/0004460 A1* | 1/2011 | Duffie | ................... | G06F 11/261 703/28 |
| 2011/0069621 A1* | 3/2011 | Gintis | .................... | H04L 43/50 370/250 |
| 2013/0006601 A1* | 1/2013 | Mlinarsky | ............. | H04W 24/06 703/23 |
| 2014/0160961 A1* | 6/2014 | Dragulescu | ............. | H04L 43/50 370/252 |
| 2014/0173094 A1* | 6/2014 | Majumdar | ............. | H04L 43/50 709/224 |
| 2014/0306719 A1* | 10/2014 | Dunsmore | .......... | G01R 35/005 324/601 |
| 2014/0321285 A1* | 10/2014 | Chew | ..................... | H04L 43/10 370/236 |
| 2014/0337674 A1* | 11/2014 | Ivancic | ................. | H04L 41/342 714/43 |
| 2016/0212641 A1* | 7/2016 | Kong | ................. | H04B 17/0087 |
| 2016/0337052 A1* | 11/2016 | Wen | ................... | H04B 10/2575 |
| 2017/0223559 A1* | 8/2017 | Kong | ................... | H04B 7/0413 |
| 2017/0295084 A1* | 10/2017 | Ramanath | ........... | H04L 43/0876 |
| 2019/0215707 A1* | 7/2019 | Jackson | ................ | H04W 24/06 |
| 2019/0294995 A1* | 9/2019 | Pastor Perales | ....... | G06N 20/00 |
| 2020/0220788 A1* | 7/2020 | Ramanathan | ...... | H04B 17/3912 |
| 2020/0296023 A1* | 9/2020 | Kumar | .................... | H04L 43/12 |
| 2020/0313999 A1* | 10/2020 | Lee | .................... | H04L 43/0847 |
| 2021/0014709 A1* | 1/2021 | Devarasetty | ........ | H04W 72/542 |
| 2021/0136867 A1* | 5/2021 | Duffy | .................... | H04W 24/06 |
| 2021/0190830 A1* | 6/2021 | Scott | .................. | G01R 1/06766 |
| 2022/0116303 A1* | 4/2022 | Sommers | ................ | H04L 41/12 |
| 2022/0247661 A1* | 8/2022 | Liu | ......... | G06F 11/34 |
| 2022/0253324 A1* | 8/2022 | Liu | ..................... | G06F 11/2273 |
| 2023/0006912 A1* | 1/2023 | Liu | ........................ | H04L 43/50 |
| 2023/0171177 A9* | 6/2023 | Liu | ........................ | H04L 43/50 370/252 |

OTHER PUBLICATIONS

Pilimon et al., "A Hybrid Testbed for Performance Evaluation of Large-Scale Datacenter Networks," ICNC, pp. 409-413 (2018).

Alsulami "Application Based Network Traffic Generator for Networking AI Model Development," Thesis submitted to the School of Engineering of the University of Dayton, pp. 1-47 (2021).

* cited by examiner

300

| TOPOLOGY ID (TID) | TOPOLOGY DESCRIPTION |
|---|---|
| TOP_1 | 3-stage clos - [a,b,c] switches at each layer, x,y,z speeds and feeds |
| TOP_2 | 3-stage clos - [a,b,c,d] switches at each layer, x,y,z speeds and feeds |
| TOP_3 | 5-stage clos - [a,b,c] switches at each layer, v,x,y speeds and feeds |
| TOP_4 | 3-stage clos - [a,b,c] switches at PODSW, [d,e] at TORSW, [f] at SPSW, x speeds and feeds at PODSW, y speeds and feeds at TORSW, z speeds and feeds at SPSW |

| TID | ESID | LOGICAL PORT | PSID | PHYSICAL PORT |
|---|---|---|---|---|
| TOP_1 | TORSW1 | 1 | SW1 | 47 |
| TOP_1 | TORSW1 | 2 | SW1 | 14 |
| TOP_1 | TORSW1 | 3 | SW1 | 35 |
| TOP_1 | TORSW2 | 1 | SW1 | 22 |
| TOP_1 | TORSW2 | 5 | SW1 | 77 |
| TOP_1 | TORSW2 | 7 | SW1 | 62 |
| ... | ... | ... | ... | ... |
| TOP_1 | TORSW2 | 6 | SW1 | 33 |
| TOP_4 | TORSW3 | 2 | SW1 | 60 |
| TOP_4 | TORSW3 | 3 | SW1 | 26 |
| TOP_4 | TORSW3 | 4 | SW1 | 37 |
| TOP_4 | TORSW4 | 1 | SW1 | 18 |
| TOP_4 | TORSW4 | 3 | SW1 | 22 |
| TOP_4 | TORSW4 | 5 | SW1 | 23 |

METHODS, SYSTEMS, AND COMPUTER READABLE MEDIA FOR NETWORK TRAFFIC GENERATION USING MACHINE LEARNING

PRIORITY CLAIM

This application claims the priority benefit of Romanian Patent Application Serial Number a 2021 10035, filed Jul. 2, 2021, the disclosure of which is incorporated herein by reference in its entirety.

TECHNICAL FIELD

The subject matter described herein relates to network testing. More specifically, the subject matter relates to methods, systems, and computer readable media for network traffic generation using machine learning.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization.

When testing data center equipment, it is important to make sure that testing mimics real world scenarios and conditions. For example, when testing a data center server or related applications, it may be necessary to mimic or emulate resources in the data center. For example, when testing a data center server or related applications, it may be necessary to mimic or emulate a switching fabric or other resources in the data center and to emulate or approximate various equipment or system related states, e.g., by using various test system configurations or settings and/or effecting various impairments.

Accordingly, a need exists for methods, systems, and computer readable media for network traffic generation for stimulating or testing network systems.

SUMMARY

Methods, systems, and computer readable media for network traffic generation using machine learning. An example method includes collecting first traffic from a production data center environment. At least a portion of the first traffic comprises live computer network traffic transiting the production data center environment. The method includes collecting second traffic from an emulated data center testbed device. At least a portion of the second traffic comprises testbed traffic that transits an emulated data center switching fabric of the emulated data center testbed device. The method includes training a traffic generation inference engine using the first traffic and the second traffic. The method includes generating, using the traffic generation inference engine, test traffic to test or stimulate a network system under test (SUT).

An example system includes at least one processor, memory storing executable instructions for the at least one processor, and a machine learning network traffic generator implemented on the at least one processor. The machine learning network traffic generator is configured for: collecting first traffic from a production data center environment, wherein at least a portion of the first traffic comprises live computer network traffic transiting the production data center environment; collecting second traffic from an emulated data center testbed device, wherein at least a portion of the second traffic comprises testbed traffic that transits an emulated data center switching fabric of the emulated data center testbed device; training a traffic generation inference engine using the first traffic and the second traffic; and generating, using the traffic generation inference engine, test traffic to test or stimulate a network system under test (SUT).

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 3 is a diagram illustrating example switching topology configuration information;

FIG. 4 is a diagram illustrating example port mapping data for mapping emulated switch ports to physical switch ports;

DETAILED DESCRIPTION

The subject matter described herein includes methods, systems, and computer readable media for network traffic generation using machine learning. In accordance with some aspects of the subject matter described herein, a test system (e.g., one or more computing platforms, devices, or nodes)

may be configured to emulate a switching fabric environment, such as virtual networking resources and/or other data center related resources, by using a switch ASIC resource and/or one or more physical switches. Some embodiments include one or more emulated switches, where an emulated switch is a logically allocated portion of a physical switch ASIC that is made to look like an independent logical switch device to the environment (e.g., a device under test (DUT), a system under test (SUT), or a controller) by using a switch ASIC resource allocator. In some embodiments, the resource allocator is adapted to facilitate collection and reporting of emulated logical switch performance metric information (e.g., emulated logical switch queue depth, emulated logical switch latency, etc.) during a test run or session by a visibility module.

Figure 1:
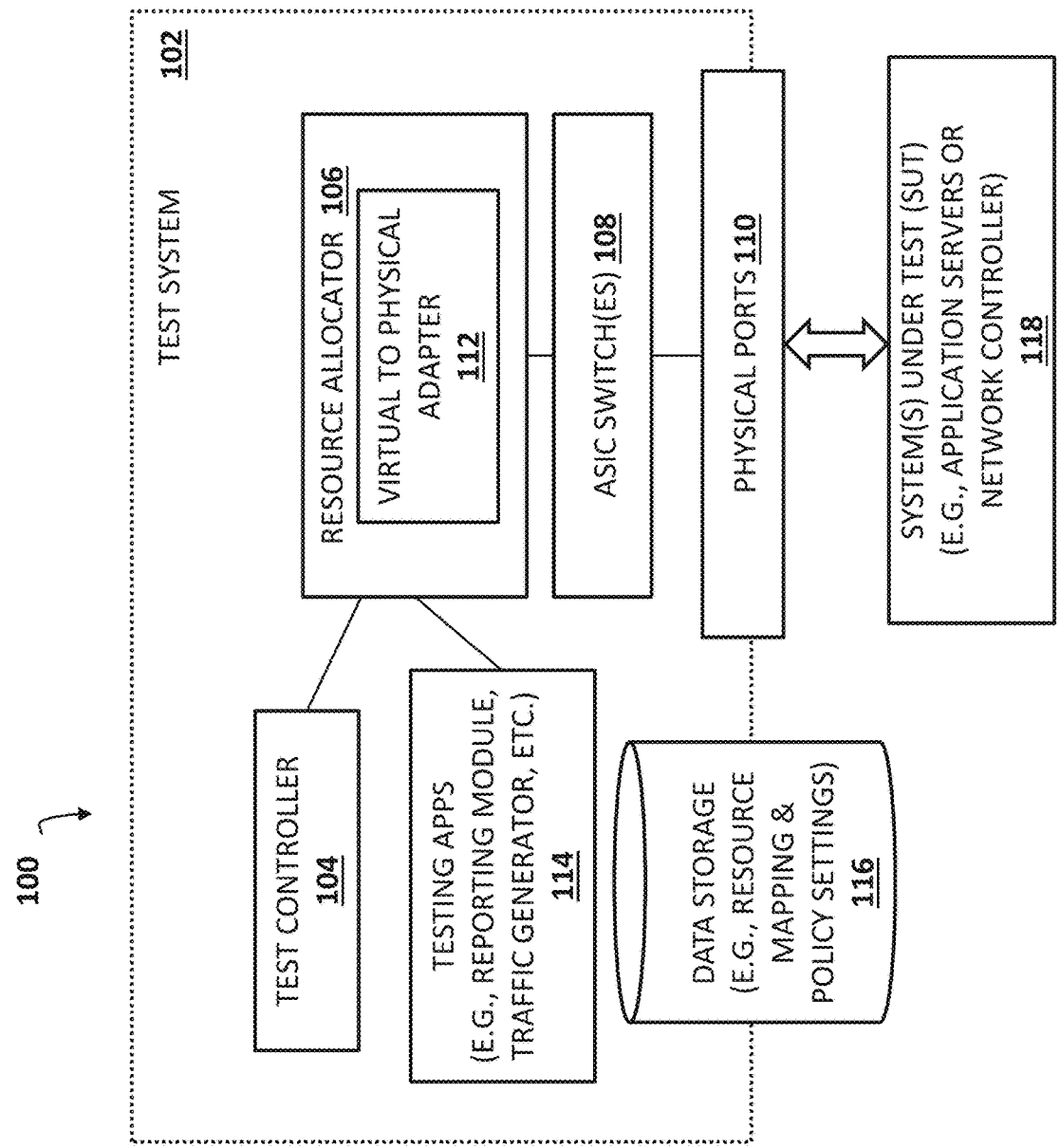
FIG. 1 is a diagram illustrating an environment for impairment testing using an impairment device.

FIG. 1 is a diagram illustrating a computing environment 100 for impairment testing using an impairment device. Computing environment 100 may include one or more networks and/or one or more computer platforms, nodes, or devices. Computing environment 100 may include a test system 102 and/or a SUT 118.

Test system 102 may represent any suitable entity or entities (e.g., one or more computing platforms, nodes, or devices) associated with testing SUT 118 (e.g., one or more application servers, a network controller, or a NMS). For example, test system 102 may generate and send traffic to SUT 118 and/or receive traffic from SUT 118 and may analyze one or more performance aspects associated with SUT 118. SUT 118 may be any suitable entity or entities (e.g., devices, systems, or platforms) for receiving, processing, forwarding, and/or sending one or more messages (e.g., packets).

In some embodiments, test system 102 may include a stand-alone tool, a testing device, a network equipment test device or platform, or software executing on one or more processor(s). In some embodiments, test system 102 may be a single device or node or may be distributed across multiple devices or nodes. In some embodiments, test system 102 may include one or more modules for performing various test related functions. For example, test system 102 may include a traffic (e.g., packet) generator for generating test traffic and/or testing related applications (e.g., a test analyzer or test configuration manager) for testing SUT 118.

Test system 102 may include a test controller (TC) 104, resource allocator (RA) 106, physical ASIC switch(es) 108, ports 110, testing applications 114, and data storage 116. TC 104 may be any suitable entity or entities (e.g., software executing on a processor, a field-programmable gateway array (FPGA), and/or an ASIC, or a combination of software, an FPGA, and/or an ASIC) for performing one or more aspects associated with testing SUT 118 and/or various aspects thereof. In some embodiments, TC 104 may be implemented using one or more processors and/or memory. For example, TC 104 may utilize one or more processors (e.g., executing software stored in memory) to generate traffic patterns or scenarios for various message streams (e.g., flows or sessions). In another example, TC 104 may also utilize one or more processors to perform or initiate various tests and/or analyses involving test packets and/or related responses from SUT 118. In this example, TC 104 may send instructions to various modules or entities, e.g., testing applications 114, in test system 102 for controlling (e.g., to pause, (re)start, or stop) a test session.

In some embodiments, TC 104 may utilize out-of-band and/or in-band ports and/or interfaces for communicating with entities of test system 102. For example, in embodiments where TC 104 is external to RA 106, TC 104 may communicate with RA 106 via a management port or related interface.

In some embodiments, TC 104 may interact with one or more testing applications 114. Testing applications 114 may represent software for configuring test system 102 or portions thereof. In some embodiments, testing applications 114 can include, but are not limited to, visibility applications, SDN controller applications, GUI and CLI applications, and test traffic generation applications for communicating with SUT 118 and/or an emulated switching fabric environment implemented using ASIC switch(es) 108.

In some embodiments, test system 102 or aspects thereof may be controlled or defined using one or more user-definable data models. For example, test system 102 may provide a GUI to allow a user to configure or modify a switch ASIC resource allocator model, a switching model, a data center emulation or switching topology model, a traffic generator model, a network visibility model, etc. In this example, high-level or user-definable data models may be converted into lower-level data models or into computer readable instructions for implementing the user-definable data models, e.g., implementing a data center emulation model on ASIC switch(es) 108.

In some embodiments, testing applications 114 may include or utilize one or more user interfaces for receiving settings and/or configuration information for setting up a testing scenario or a related test session. For example, a user interface may include any interface usable by one or more types of user (e.g., a human or another entity like an application, a machine, or a device) to interact with test system 102 or related entities. In some embodiments, one or more user interfaces may support automation e.g., via one or more programming languages (e.g., python), a representation state transfer (REST) API, a remote procedure call API (e.g., gRPC API), a command line interface (CLI), a machine-to-machine (M2M) automation interface, and/or a web based GUI. For example, a test operator may use a web browser to interact with a web based GUI associated with TC 104 and/or testing applications 114 for programming or configuring one or more aspects for testing SUT 118. In another example, a network controller may utilize a M2M automation interface for programming or configuring one or more aspects for testing SUT 118.

In some embodiments, testing applications 114 may include or utilize a GUI or other user interface for selecting and/or configuring emulated switching fabric environments and/or other related settings (e.g., test reporting and/or network visibility settings). For example, testing applications 114 may include a web based GUI for obtaining a test operator or another entity's intent for setting up or configuring testing scenarios and/or related emulated switching fabric environments. In this example, the GUI can be used to visually describe a topology comprising one or more emulated switches and/or to indicate particular physical resources to allocate to each emulated switch. In another example, the GUI can be used to gather test session settings and/or other information.

In some embodiments, from an end user perspective, a test system related user interface may provide and/or receive configuration settings for emulated switches associated with an emulated data center environment. In such embodiments, a user can use the user interface to configure a specific data center environment in which SUT 118 will operate or interact with and can monitor performance of both SUT 118 and the performance of the emulated switches that comprise the emulated data center environment.

In some embodiments, testing applications 114 may include or utilize a traffic generator. For example, a traffic generator may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. In this example, the traffic generator may be configured to utilize user input and predefined test case templates or related data to generate one or more test cases and/or test sessions.

In some embodiments, testing applications 114 may include or utilize a reporting module and may be configurable by TC 104. For example, a reporting module may be any suitable entity or entities (e.g., software executing on a processor, an ASIC, an FPGA, or a combination of software, an ASIC, or an FPGA) for reporting various information about testing using network visibility functions and/or components (e.g., using virtual or physical probes or network taps). In this example, virtual taps or software may be configured to generate and/or provide switch metrics or other information (e.g., network telemetry, switch and/or link status information, etc.) associated with one or more virtualized switching fabric elements (e.g., emulated switches) of an emulated switching fabric environment. Continuing with this example, the reporting module may generate performance reports or test analysis reports associated with SUT 118, e.g., by utilizing the switch metrics or other information associated with packets that pass through or are generated by SUT 118.

ASIC switch(es) 108 may be any suitable entity or entities comprising one or more ASICs (and hardware, firmware, and/or software) for performing one or more functions associated with network switching. For example, ASIC switch(es) 108 may utilize an ASIC pipeline for performing frame or packet forwarding, e.g., sending a packet received from one port out another port of the switch. In some embodiments, various resources (e.g., lookup tables or match-action tables used for forwarding decisions, traffic manager buffer memory, traffic manager logical queues, etc.) of ASIC switch(es) 108 may managed and/or allocated to provide virtualized or emulated switches by RA 106.

Ports 110 may include or utilize any suitable entity or entities (e.g., one or more network interface cards (NICs), pluggable jacks, physical processors, transceiver modules, direct-attach cables (DACs) and/or other hardware) for sending or receiving communications. For example, test system 102 may use one or more multiple ports 110 (e.g., physical connection ports) for receiving and sending various types of test packets or related data units; such as IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, ports 110 may include user traffic ports and management ports. For example, user traffic ports may be associated with processing, sending, and/or receiving test traffic, non-test traffic, and/or in-band management related communications and management ports may be associated with processing, sending, and/or receiving out-of-band management related communications.

In some embodiments, ports 110 may include multiple port modules or groups of ports for interacting with SUT 118. For example, depending on a test operator's configuration settings or a particular test session setup, RA 106 may allocate a portion of physical resources to each switch that is emulated, where the emulated switches are collectively used to mimic a data center switching fabric. In some embodiments, each emulated switch may be allocated or associated with one or more of ports 110 and the port association may be static or semi-static (e.g., particular ports may be assigned to an emulated switch for a given test session).

RA 106 may be any suitable entity or entities (e.g., software executing on a processor, an FPGA, an ASIC, or a combination of software, an FPGA, and/or an ASIC) for performing one or more aspects associated with allocating and managing emulated switches. In some embodiments, RA 106 may allocate and manage resources of ASIC switch(es) 108 for providing emulated switches without requiring a custom ASIC pipeline. In some embodiments, RA 106 can be external or internal to ASIC switch(es) 108.

In some embodiments, RA 106 may utilize one or more management ports or related interfaces for communicating with a controller or related applications (e.g., TC 104 and/or testing applications 114) and/or for communicating with ASIC switch(es) 108. For example, TC 104 or a related application may communicate with RA 106 via an out-of-band management port or related interface. In this example, RA 106 may send instructions or other communications to ASIC switch(es) 108 via another management port or related interface.

In some embodiments, RA 106 may include a virtual to physical adapter 112. Virtual to physical adapter 112 may be any suitable entity or entities (e.g., software executing on a processor, an FPGA, a ASIC, or a combination of software, an FPGA, and/or an ASIC) for converting and/or translating communications to refer to virtual or physical resources depending on the destination. For example, when requesting information about available switching resources via RA 106, testing applications 114 and/or SUT 118 may "see" a set of emulated switches each with a subset of resources instead of ASIC switch(es) 108. In this example, virtual to physical adapter 112 may translate information about virtual resources into information physical resources of a single ASIC switch (e.g., Tomahawk 3) and vice versa so that interacting nodes may remain unaware of the underlying ASIC switch(es) 108 or related switch resources.

In some embodiments, RA 106 and/or virtual to physical adapter 112 may reside between a native device interface and interacting entities (e.g., SUT 118, testing applications 114, or external devices) and may act as a communications proxy or agent using a virtual interface. For example, SUT 118 may include a network switch controller that configures switching resources by sending, via a virtual interface associated with RA 106, configuration requests for requesting and/or configuring one or more switches. In this example, RA 106 and/or virtual to physical adapter 112 may translate the configuration requests received via the virtual interface into one or more corresponding requests for transmission via a native switch interface, where the corresponding requests include commands for configuring appropriate physical resources of underlying ASIC switch(es) 108. Further, RA 106 and/or virtual to physical adapter 112 may translate switch performance results coming from a native switch interface into virtualized results (e.g., link status or counter values for a physical port '60' may be changed to values for a virtual port 'v1' on an emulated switch 'TORSW1') before sending the virtualized results to the network switch controller via the virtual interface.

In some embodiments, RA 106 and/or virtual to physical adapter 112 may create, store, and/or use switching fabric emulation data (e.g., physical to virtual port mapping, physical buffers to virtual buffers mapping and resource allocation, etc.) and related policies (e.g., virtual and real port speed, virtual and real throughput, topologies, forwarding rules, classes of service, etc.) for sharing physical switch resources amongst the emulated switches. For example, by using port mapping data and policies stored in data storage 116, virtual ports 'v1', 'v2', 'v3' on an emulated switch 'TORSW1' may be translated into physical ports '60', '61', '62', respectively. In this example, configuration commands for setting speed of port 'v1' can be translated so that the speed of corresponding physical port '60' is set. Continuing with this example, to query the statistical counters for virtual port 'v1', the statistical counters for physical port '60' may be queried.

In some embodiments, RA 106 and/or virtual to physical adapter 112 may utilize a modified proprietary (e.g., vendor) API (e.g., a vendor's software development kit (SDK) or by utilizing a wrapper API that interacts with a vendor API. For example, by using a wrapper API, RA 106 can manage a virtualized or emulated fleet of switches using off-the-shelf or commodity ASICs with NOSes that utilize a proprietary or vendor API.

In some embodiments, RA 106 and/or virtual to physical adapter 112 may utilize a custom adaptor that handles certain applications or functions which may involve a subset of resource management and mapping requirements than a standard switching API. For example, by using a custom adaptor, RA 106 can manage a virtualized or emulated fleet of switches for certain use cases using off-the-shelf or commodity ASICs.

In some embodiments, test system 102 or entities thereof (e.g., TC 104, testing applications 114, and/or RA 106) may include functionality for accessing data storage 116. Data storage 116 may be any suitable entity or entities (e.g., a storage device, a non-transitory computer readable medium, or a storage system) for maintaining or storing information related to switching fabric emulation, network testing, or related test analysis. For example, data storage 116 may include switching fabric emulation data (e.g., physical to virtual port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 116 may also include test traffic models, test cases, test session data, topology information for emulated switching fabric environments and/or for SUT 118, and/or other information usable for generating performance metrics (e.g., statistics) associated with one or more aspects of SUT 118. In some embodiments, data storage 116 may be located at test system 102, another node, or distributed across multiple platforms or devices.

FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of TC 104, RA 106, and testing applications 114.

Figure 2:
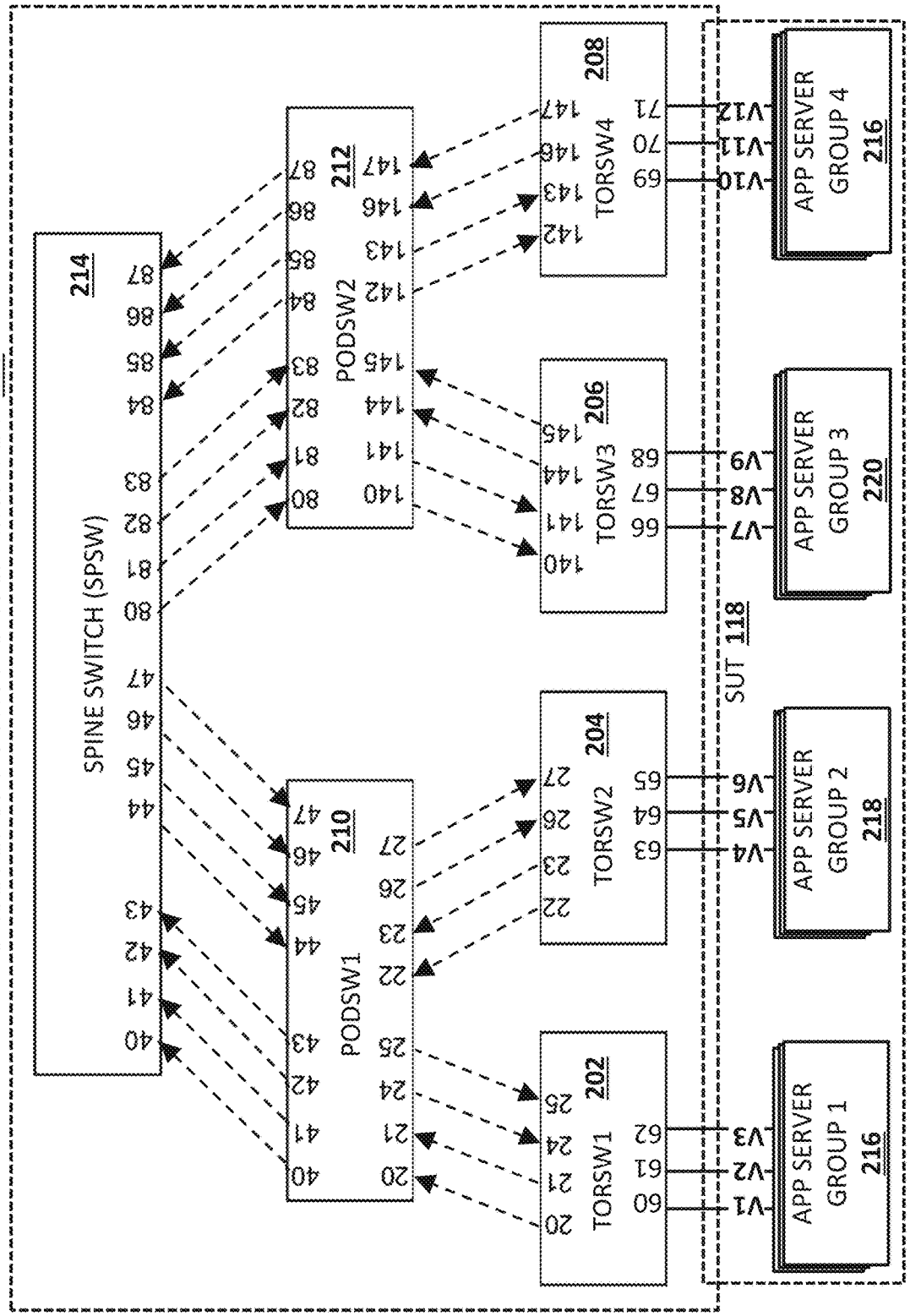
FIG. 2 is a diagram illustrating an example emulated switching fabric environment usable for network testing.

FIG. 2 is a diagram illustrating an example emulated switching fabric environment 200 usable for network testing. Emulated switching fabric environment 200 may represent an emulated data center environment comprising virtualized switching fabric elements (e.g., emulated switches) for forwarding packets from or to SUT 118 or other entities. For example, emulated switching fabric environment 200 may be based on user input and/or predetermined environment templates or data models, e.g., stored in data storage 116.

Referring to FIG. 2, emulated switching fabric environment 200 may represent a 3-stage Clos switching network comprising different stages of emulated switches, e.g., stage one may include top of rack (TOR) switches (TORSWs) 202-208, stage two may include cluster or pod switches (PODSWs) 210-212, and stage three may include a spine switch (SPSW) 214 and may be implemented using RA 106 and physical resources of one or more ASIC switch(es) 108. For example, TORSWs 202-208 may represent or emulate switches that are connected to multiple servers (e.g., located within a rack or nearby rack), PODSWs 210-212 may represent or emulate aggregation switches that are connected to multiple TORSWs, and SPSW 214 may represent or emulate a higher-level aggregation switch that is connected to multiple PODSWs.

In some embodiments, some physical ports of ASIC switch(es) 108 may be associated with different emulated switches and may utilize loopback interfaces or internal interfaces for emulating communications between some emulated switches, while other emulated switches (e.g., TORSWs 202-208) may utilize physical interfaces and/or physical cabling to communicate with SUT 118 or portions thereof.

In some embodiments, SUT 118 may represent or include a set of application server groups 216-222, each representing one or more servers and/or applications. For example, application server group 1 216 may include multiple servers (e.g., 16 or more servers in a single rack), each having one or more connections to a TOR switch. In some examples, a server of application server groups 216-222 may includes multiple applications or perform different services (e.g., machine learning (M/L), storage offload, search engines, webpages, video streaming, email, etc.) for users or may perform similar services for different sets of users. In some examples, a server of application server groups 216-222 may act as a client to another server.

In some embodiments, each of application server groups 216-222 may be connected (e.g., physically cabled) to a different set of physical ports 110 of test system 102, where each set of physical ports 110 is assigned or allocated to a particular emulated switch. For example, RA 106 may assign physical ports '60', '61', and 62' to an emulated switch 'TORSW1' and may virtualize those physical ports as 'v1', 'v2', and 'v3', respectively. In this example, applications and/or servers in application server group 1 216 may be communicatively coupled to one or more of the virtual ports of the emulated switch 'TORSW1'.

FIG. 2 is for illustrative purposes and that various depicted entities, their locations, and/or their functions described above in relation to FIG. 2 may be changed, altered, added, or removed.

FIG. 3 is a diagram illustrating example switching configuration information 300. In some embodiments, configuration information 300 may be accessed and/or stored by TC 104 and/or RA 106 using one or more data structures. In some embodiments, configuration information 300 may include any suitable information for mapping virtual ports associated with emulated switching fabric environment 200 to physical ports of physical ASIC switch(es) 108. In some embodiments, configuration information 300 may be stored or maintained in data storage 116 and may be usable for translating port information or related information in switch configuration commands, performance metrics, and/or other communications.

Referring to FIG. 3, configuration information 300 may be depicted using a table representing associations between a topology identifier (TID) and a corresponding topology description. In some embodiments, a TID may include any suitable identifier, such as one or more numbers or values, usable for identifying a switching topology or emulated switching fabric environment. For example, each switching topology or emulated switching fabric environment provided by a test operator or stored for testing may have a different, unique TID, e.g., 1, 2, 3, and 4, respectively.

In some embodiments, a topology description may include information for describing or defining an emulated switching fabric environment, e.g., emulated switching fabric environment 200. For example, a topology description may indicate the type of switching environment including the number of stages, the types and number of emulated switches and ports at each stage, along with various characteristics (e.g., port speeds, link speeds, forwarding rules, throughput limits, etc.) that can be used to emulate or virtualize the switching environment described.

Configuration information 300 in FIG. 3 is for illustrative purposes and that different and/or additional information may also be stored or maintained. Further, configuration information 300 may be stored in various data structures, memories, media, and/or in one or more locations.

FIG. 4 is a diagram illustrating example port mapping data 400 for mapping virtual ports of emulated switches (e.g., TORSWs 202-208) to physical ports of physical ASIC switch(es) 108. In some embodiments, port mapping data 400 may be accessed and/or stored by TC 104 and/or RA 106 using one or more data structures. In some embodiments, port mapping data 400 may include any suitable information for mapping virtual ports associated with emulated switching fabric environment 200 to physical ports of physical ASIC switch(es) 108. In some embodiments, port mapping data 400 may be stored or maintained in data storage 116 and may be usable for translating port information or related information in switch configuration commands, performance metrics, and/or other communications.

Referring to FIG. 4, port mapping data 400 may be depicted using a table representing associations between virtual port information and physical port information. For example, each row or association may include a TID, an emulated switch identifier (ESID), a virtual port number, and a corresponding physical switch identifier (PSID) and a physical port number.

In some embodiments, a TID may include any suitable identifier, such as one or more numbers or values, usable for identifying a switching topology or emulated switching fabric environment. For example, a test operator may select a 3-stage Clos network environment with particular characteristics to emulate for a first test session, a 3-stage Clos network environment with different characteristics to emulate for a second test session, a 5-stage Clos network environment with particular characteristics to emulate for a third test session, and a 7-stage Clos network environment with particular characteristics to emulate for a fourth test session. In this example, each switching topology or emulated switching fabric environment may have a different, unique TID, e.g., 1, 2, 3, and 4, respectively.

In some embodiments, an ESID may include any suitable identifier, such as one or more numbers or values, usable for identifying an emulated switch. For example, emulated switching fabric environment 200 may have seven emulated switches, each switch having a unique name and/or number, e.g., 'TORSW1', 'A', '234553242', etc. In some embodiments, ESIDs may be unique within a topology or an emulated switching fabric environment. In some embodiments, ESID may be unique amongst multiple (or even all) defined topologies or emulated switching fabric environments.

In some embodiments, a virtual port number may include any suitable identifier, such as one or more numbers or values, usable for identifying a port of an emulated switch. For example, an emulated switch 'PODSW1' of emulated switching fabric environment 200 may have multiple virtual ports, each having a unique name and/or number at least within that emulated switch, e.g., 'v1', 'v2', 'v3', etc. In some embodiments, virtual port numbers may be unique within a topology or an emulated switching fabric environment. In some embodiments, virtual port numbers may be unique amongst multiple (or even all) defined topologies or emulated switching fabric environments.

In some embodiments, an ESID may include any suitable identifier, such as one or more numbers or values, usable for identifying a physical switch, e.g., physical ASIC switch(es) 108. For example, test system 102 may have one or two physical ASIC switch(es) 108, each switch having a unique name and/or number, e.g., 'SW1, 'A', '234553242', etc. In some embodiments, PSIDs may be unique within a test system or network. In some embodiments, ESID may be unique amongst multiple (or even all) networks controlled by an operator or service provider.

In some embodiments, a physical port number may include any suitable identifier, such as one or more numbers or values, usable for identifying a port of physical ASIC switch(es) 108. For example, physical ASIC switch(es) 108 may have multiple physical traffic ports, each having a unique name and/or number at least within each physical switch, e.g., '60', '61', '62', etc. In some embodiments, physical port numbers may be unique within each of physical ASIC switch(es) 108. In some embodiments, physical port numbers may be unique amongst multiple (or even all) physical ASIC switch(es) 108.

In some embodiments, e.g., where multiple emulated switching fabric environments (e.g., for different test sessions or network configurations) are stored, a TID, an ESID, and a virtual port number may be used as a combination key or value for identifying a corresponding physical switch and port. In some embodiments, e.g., where one emulated switching fabric environment 200 is stored, an ESID and a virtual port number may be used as a combination key or value for identifying a corresponding physical switch and port. In some embodiments, e.g., where each virtual port number is unique in emulated switching fabric environment 200, a virtual port number may be used as a combination key or value for identifying a corresponding physical switch and port.

Port mapping data 400 in FIG. 4 is for illustrative purposes and that different and/or additional information may also be stored or maintained. Further, it will be appreciated that port mapping data 400 may be stored in various data structures, memories, media, and/or in one or more locations.

Figure 5:
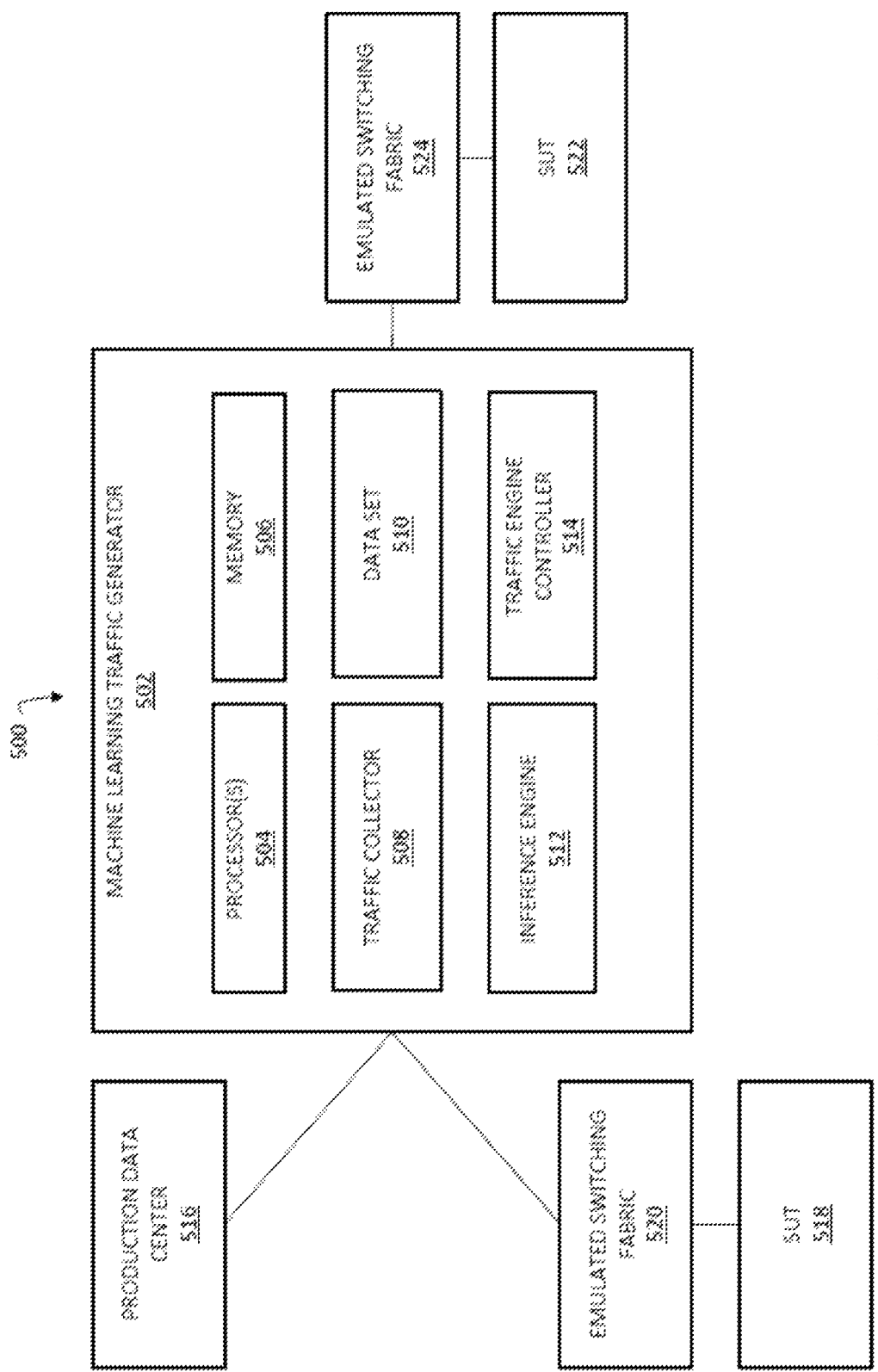
FIG. 5 is a block diagram illustrating an example network environment 500 for network traffic generation using machine learning.

FIG. 5 is a block diagram illustrating an example network environment 500 for network traffic generation using machine learning. A machine learning traffic generator 502 is implemented on at least one processor 504 and memory 506 storing instructions for the processor 504. Machine learning traffic generator 502 includes a traffic collector 508, a data set 510, an inference engine, and a traffic engine controller 514.

In operation, a live production data center 516 is monitored (e.g., via port mirroring, taps, probes, etc.) to obtain production network traffic information about packets flowing through the production data center environment (e.g., north-south traffic, east-west traffic, etc.). This production traffic information may be comprised of copies of packets flowing within the production data center network and/or flow information (e.g., Netflow records, flow summary records, etc.). Flow information may be generated by constituent components of the monitored production data center network or by external visibility system components (e.g., network packet broker, etc.) deployed within/adjacent to the production data center 516.

A SUT 518 in a lab/testbed setting is adapted to communicate with an emulated data center switching fabric environment 520, which is monitored (e.g., via port mirroring, taps, probes, etc.) to obtain testbed network traffic information about packets flowing through the testbed's emulated data center environment (e.g., north-south traffic, east-west traffic, etc.). This testbed information may be comprised of copies of packets flowing within the emulated data center switching fabric and/or flow information (e.g., Netflow records, flow summary records, etc.). Flow information may be generated by components of the emulated data center network (e.g., hardware/software monitoring agents configured within the switching fabric emulator) or by external visibility system components (e.g., network packet broker, etc.) deployed in conjunction with the switching fabric emulation device(s).

Figure 6:
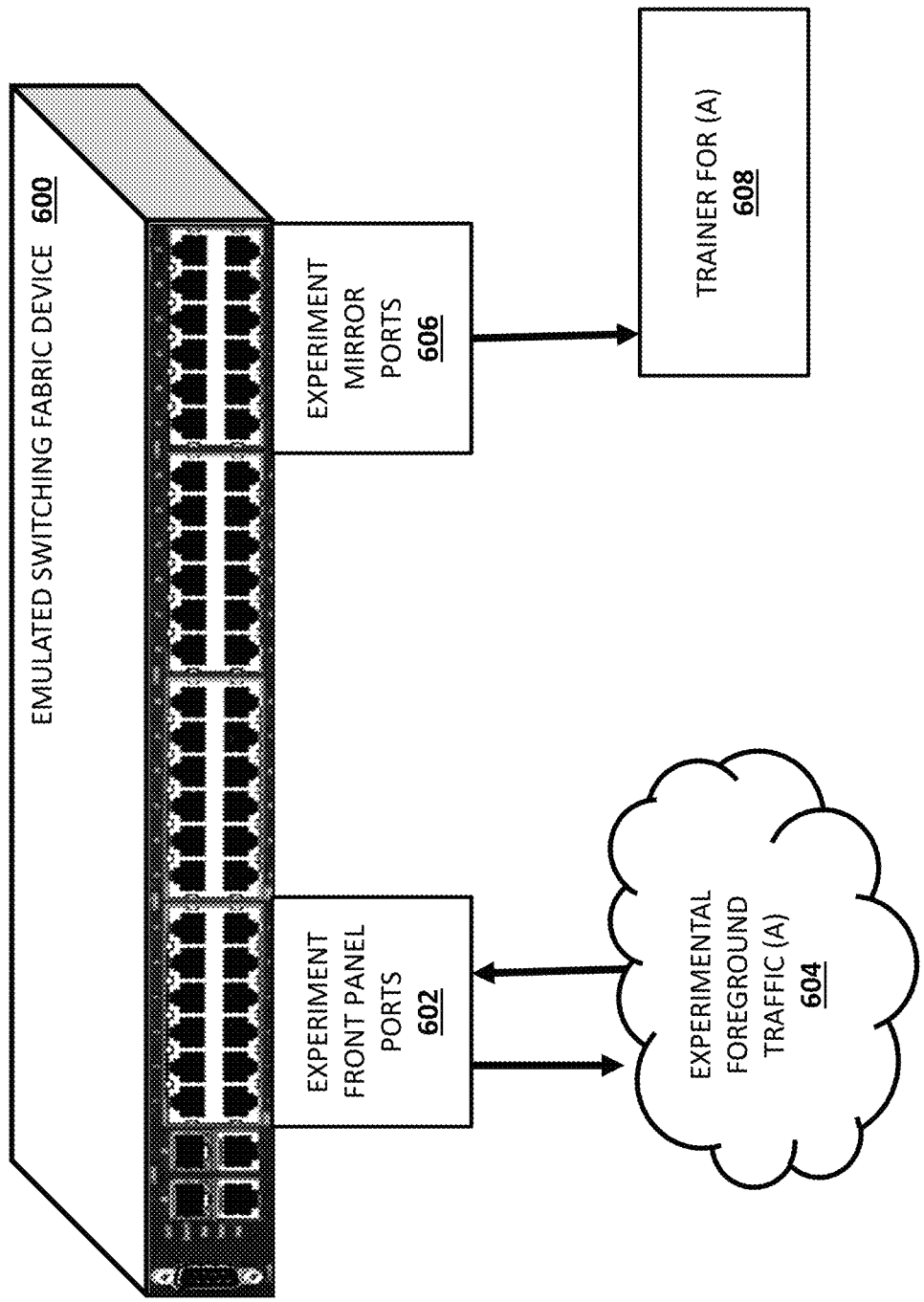
FIG. 6 illustrates the monitoring of the emulated data center switching fabric environment.

FIG. 6 illustrates the monitoring of the emulated data center switching fabric environment. FIG. 6 shows an example emulated switching fabric device 600, which is a computing platform (e.g., a stand-alone device or appliance comprising hardware, software, and firmware) configured to emulate one or more switching fabrics. Emulated switching fabric device 600 may also be configured to perform related functions associated with configuring, controlling, and/or interacting with an emulated switching fabric. For example, emulated switching fabric device 600 may be configured to emulate a data center switching fabric (e.g., environment 200) comprising virtualized switching fabric elements implemented using physical ASIC resources. In this example, emulated switching fabric device 600 may also include modules and/or software for emulating the data center switching fabric, for performing testing associated with the emulated data center switching fabric, and for monitoring traffic or related test performance associated with the emulated data center switching fabric.

As shown in FIG. 6, experimental foreground traffic (A) 604 flows back and forth between a SUT 518 and the device 600 by way of experiment front panel ports 602. The traffic is mirrored on experiment mirror ports 606 to a trainer 608 for training an inference engine to generate test traffic consisted with the experimental foreground traffic (A). The functions of the trainer 608 are described further below with reference to FIG. 5.

The device 600 may include test traffic generation functionality, which enables the emulation device(s) to source and sink test packets within the emulated switching fabric (e.g., generate/terminate background traffic during execution of a test case). In some embodiments, the device 600 includes one or more test traffic generator agents, which are adapted to generate test packets/flows associated with the execution of a test case. In some embodiments, a test generator agent may be comprised of hardware/software/firmware located within the device 600. In other embodiments, a test generator agent may be deployed/hosted in a cloud environment (e.g., a cloud-hosted native traffic generation agent or app component of the test system, a cloud-hosted 3rd party traffic generation agent or app, etc.).

Referring back to FIG. 5, the monitored data from the production and testbed environments is sent to traffic collector 508. The traffic collector may process the received traffic information to change the format of the traffic information. In one embodiment, the traffic collector may receive copies of packets associated with a flow and in turn generate an associated flow record (e.g., Netflow, etc.). In one embodiment, the traffic collector may implement one or more filters to selectively process subsets of the total traffic which it receives.

For example, traffic collector 508 may implement a filter that identifies flows associated with a particular type of communication session (e.g., Streaming Video, Voice Call, Web Browsing, etc.) and selectively append this information to a particular/associated data set. Such filters may be used to groom ingress traffic information received at the collector, such that different traffic subsets are tagged and/or stored in different data sets. In some embodiments, a filter may identify and select ingress traffic that is to be discarded.

In another example, traffic collector 508 may implement sampling functionality, such that only a fraction of the ingress traffic is processed and ultimately stored in a data set(s). In some examples, traffic collector 508 may be implemented by a suitably configured network packet broker (NPB), or similar network visibility device.

Traffic information received by traffic collector 508 is stored in one or more data sets 510. Data sets 510 may, for example, be configured to include traffic information (e.g., packet copies, flow records, temporal characteristics, etc.) for certain subsets of traffic (e.g., packets or flow records associated with only a certain end user application, message type, protocol type, etc.). Data sets 510 may be stored in a cloud storage network or local data store.

At least a portion of the data in data set 510 may be used to train an inference engine 512, such as a neural network or a generative adversarial network (GAN), which is then used to drive test system traffic generators by traffic engine controller 514. ML-driven traffic generators associated with the test system can, for example, be used to synthesize/generate background workload traffic in a subsequent test. Such ML-generated background workload test traffic may be used to test/stimulate a DUT/SUT in testbed setting or alternatively to test/stimulate network elements in a live/production environment.

Figure 7:
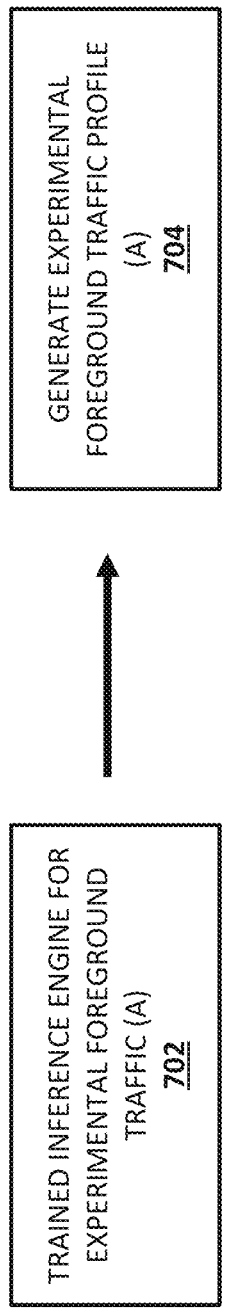
FIG. 7 illustrates machine learning-driven traffic generation.

FIG. 7 illustrates machine learning-driven traffic generation. A trained inference engine for experimental foreground traffic (A) 702 is used to generate an experimental foreground traffic profile (A) 704.

Figure 8:
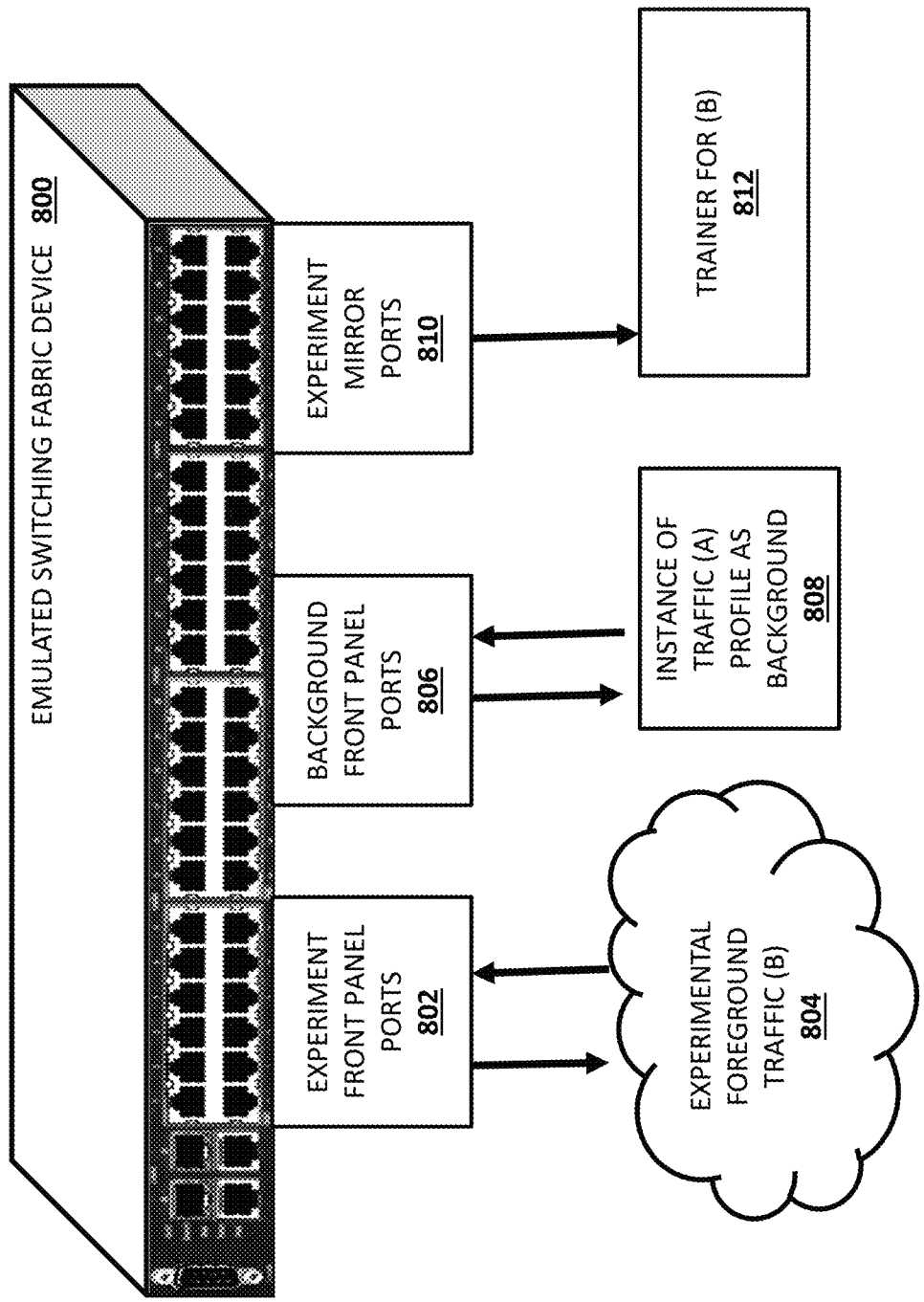
FIG. 8 is an example deployment & use case of an emulated switching fabric device.

FIG. 8 is an example deployment & use case of an emulated switching fabric device 800. As shown in FIG. 8, a previously learned (machine learned), first traffic workload profile (A) is used in the creation of a second traffic workload profile (B). Experimental foreground traffic (B) 804 flows into the device 800 by way of experiment front panel ports. An instance of traffic (A) profile as background is used to provide traffic to background front panel ports 806. Experiment mirror ports 810 are used to mirror traffic to a machine learning trainer 812 for experimental foreground traffic (B) observed.

In this case, a ML-driven traffic generator is adapted to direct test traffic into a testbed environment. Additional traffic generated by either a testbed environment-based DUT/SUT or a production environment-based DUT/SUT is simultaneously fed into the emulated switching fabric. Monitored traffic is then collected and used to train/construct/refine another GAN traffic generation profile/model.

Figure 9:
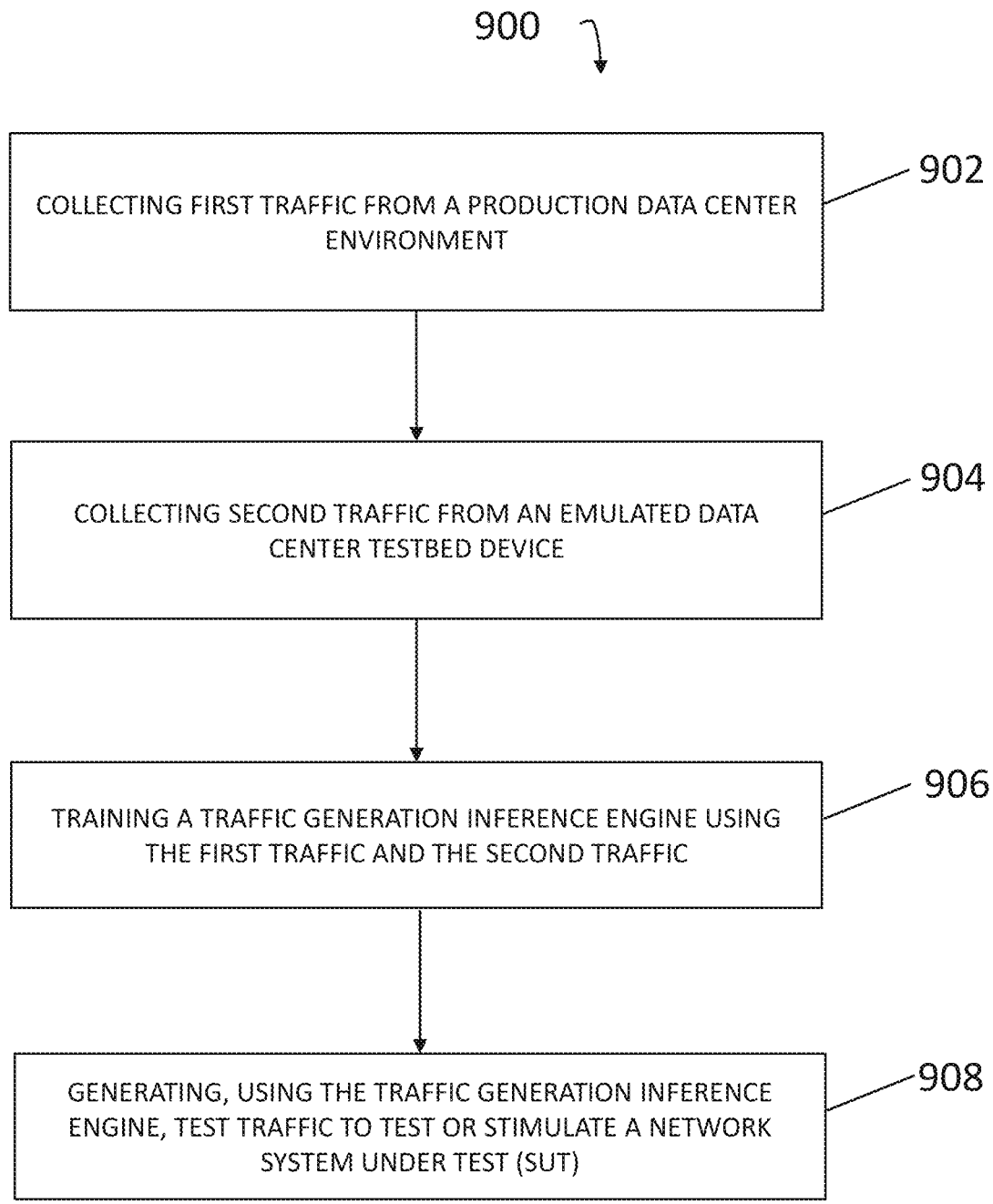
FIG. 9 is a flow diagram of an example method for network traffic generation using machine learning.

FIG. 9 is a flow diagram of an example method 900 for network traffic generation using machine learning. The method 900 may be performed by the machine learning traffic generator 502 of FIG. 5 or by any appropriate network computing device.

The method 900 includes collecting first traffic from a production data center environment. At least a portion of the first traffic comprises live computer network traffic transiting the production data center environment. Collecting first traffic from the production data center environment can include, e.g., collecting copies of packets flowing within the production data center environment, collecting flow information of network flows within the production data center environment, or both.

The method 900 includes collecting second traffic from an emulated data center testbed device. At least a portion of the second traffic comprises testbed traffic that transits an emulated data center switching fabric of the emulated data center testbed device. The emulated data center testbed device can include physical application-specific integrated circuit (ASIC) switching resources, and the emulated data center switching fabric can include virtualized data center switching fabric elements.

Collecting second traffic from the emulated data center testbed device can include, e.g., collecting copies of a plurality of packets flowing within the emulated data center testbed device, collecting flow information of a plurality of network flows within the emulated data center testbed device, or both. Collecting second traffic from the emulated data center testbed device can include generating, by the emulated data center testbed device, synthetic traffic to source and sink a plurality of test packets within the emulated data center testbed device.

Collecting the first traffic and collecting the second traffic comprises identifying one or more flows associated with a type of communication session and storing the type of communication session with one or more flow records for the one or more flows.

The method 900 includes training a traffic generation inference engine using the first traffic and the second traffic. Training the traffic generation inference engine using the first traffic and the second traffic can include training a neural network or a generative adversarial network (GAN). Training does not necessarily require both traffic inputs from real and emulated data centers. Training can be carried out with real data center traffic or traffic injected by the user in the emulated data center or both.

The method 900 includes generating, using the traffic generation inference engine, test traffic to test or stimulate a network system under test (SUT). Generating test traffic to test or stimulate the SUT can include transmitting the test traffic to the SUT in a testbed setting or to the SUT in a live production environment.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network traffic generation using machine learning, the method comprising:
collecting first traffic from a production data center environment, wherein at least a portion of the first traffic comprises live computer network traffic transiting the production data center environment;
collecting second traffic from an emulated data center testbed device, wherein at least a portion of the second traffic comprises testbed traffic that transits an emulated data center switching fabric of the emulated data center testbed device;
training a traffic generation inference engine using the first traffic and the second traffic; and
generating, using the traffic generation inference engine, test traffic to test or stimulate a network system under test (SUT).

2. The method of claim 1, wherein the emulated data center testbed device comprises physical application-specific integrated circuit (ASIC) switching resources, and wherein the emulated data center switching fabric comprises virtualized data center switching fabric elements.

3. The method of claim 1, wherein collecting first traffic from the production data center environment comprises collecting copies of a plurality of packets flowing within the production data center environment.

4. The method of claim 1, wherein collecting first traffic from the production data center environment comprises collecting flow information of a plurality of network flows within the production data center environment.

5. The method of claim 1, wherein collecting second traffic from the emulated data center testbed device comprises collecting copies of a plurality of packets flowing within the emulated data center testbed device.

6. The method of claim 1, wherein collecting second traffic from the emulated data center testbed device comprises collecting flow information of a plurality of network flows within the emulated data center testbed device.

7. The method of claim 1, wherein collecting second traffic from the emulated data center testbed device comprises generating, by the emulated data center testbed device, synthetic traffic to source and sink a plurality of test packets within the emulated data center testbed device.

8. The method of claim 1, wherein collecting the first traffic and collecting the second traffic comprises identifying one or more flows associated with a type of communication session and storing the type of communication session with one or more flow records for the one or more flows.

9. The method of claim 1, wherein training a traffic generation inference engine using the first traffic and the second traffic comprises training a neural network or a generative adversarial network (GAN).

10. The method of claim 1, wherein generating test traffic to test or stimulate the SUT comprises transmitting the test traffic to the SUT in a testbed setting or to the SUT in a live production environment.

11. A system for network traffic generation using machine learning, the system comprising:
at least one processor and memory storing executable instructions for the at least one processor; and
a machine learning network traffic generator implemented on the at least one processor and configured for:
collecting first traffic from a production data center environment, wherein at least a portion of the first traffic comprises live computer network traffic transiting the production data center environment;

collecting second traffic from an emulated data center testbed device, wherein at least a portion of the second traffic comprises testbed traffic that transits an emulated data center switching fabric of the emulated data center testbed device;

training a traffic generation inference engine using the first traffic and the second traffic; and generating, using the traffic generation inference engine, test traffic to test or stimulate a network system under test (SUT).

12. The system of claim 11, wherein the emulated data center testbed device comprises physical application-specific integrated circuit (ASIC) switching resources, and wherein the emulated data center switching fabric comprises virtualized data center switching fabric elements.

13. The system of claim 11, wherein collecting first traffic from the production data center environment comprises collecting copies of a plurality of packets flowing within the production data center environment.

14. The system of claim 11, wherein collecting first traffic from the production data center environment comprises collecting flow information of a plurality of network flows within the production data center environment.

15. The system of claim 11, wherein collecting second traffic from the emulated data center testbed device comprises collecting copies of a plurality of packets flowing within the emulated data center testbed device.

16. The system of claim 11, wherein collecting second traffic from the emulated data center testbed device comprises collecting flow information of a plurality of network flows within the emulated data center testbed device.

17. The system of claim 11, wherein collecting second traffic from the emulated data center testbed device comprises generating, by the emulated data center testbed device, synthetic traffic to source and sink a plurality of test packets within the emulated data center testbed device.

18. The system of claim 11, wherein collecting the first traffic and collecting the second traffic comprises identifying one or more flows associated with a type of communication session and storing the type of communication session with one or more flow records for the one or more flows.

19. The system of claim 11, wherein training a traffic generation inference engine using the first traffic and the second traffic comprises training a neural network or a generative adversarial network (GAN).

20. The system of claim 11, wherein generating test traffic to test or stimulate the SUT comprises transmitting the test traffic to the SUT in a testbed setting or to the SUT in a live production environment.

* * * * *